United States Patent
Yang et al.

(10) Patent No.: US 9,567,523 B2
(45) Date of Patent: Feb. 14, 2017

(54) BLUE PHASE LIQUID CRYSTAL COMPOSITE MATERIAL AND LIQUID CRYSTAL DISPLAY COMPRISING THE SAME

(71) Applicant: BOE TECHNOLOGY GROUP CO., LTD., Beijing (CN)

(72) Inventors: Huai Yang, Beijing (CN); Birong Li, Beijing (CN); Wanli He, Beijing (CN); Ling Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 79 days.

(21) Appl. No.: 14/355,248

(22) PCT Filed: Nov. 15, 2013

(86) PCT No.: PCT/CN2013/087264
§ 371 (c)(1),
(2) Date: Apr. 30, 2014

(87) PCT Pub. No.: WO2014/190682
PCT Pub. Date: Dec. 4, 2014

(65) Prior Publication Data
US 2015/0315467 A1    Nov. 5, 2015

(30) Foreign Application Priority Data
May 31, 2013    (CN) .......................... 2013 1 0214774

(51) Int. Cl.
*C09K 19/54*    (2006.01)
*C09K 19/02*    (2006.01)
(Continued)

(52) U.S. Cl.
CPC ............ *C09K 19/0275* (2013.01); *C09K 19/18* (2013.01); *C09K 19/322* (2013.01); *C09K 19/52* (2013.01);
(Continued)

(58) Field of Classification Search
CPC ..................................................... C09K 19/32
See application file for complete search history.

(56) References Cited

U.S. PATENT DOCUMENTS

2013/0153822 A1* 6/2013 Zheng ............... C09K 19/0275
252/299.64

FOREIGN PATENT DOCUMENTS

| CN | 2005080529 A1 | 9/2005 |
| CN | 102517035 A | 6/2012 |

(Continued)

OTHER PUBLICATIONS

Second Office Action issued by the Chinese Patent Office for Chinese Patent Application No. 201310214774.X dated Sep. 15, 2014, 4 pages.

(Continued)

*Primary Examiner* — Chanceity Robinson
(74) *Attorney, Agent, or Firm* — Ladas & Parry LLP

(57) ABSTRACT

A blue phase liquid crystal composite material and a liquid crystal display comprising the same, can solve the problem of small Kerr constant of the current blue phase liquid crystal and the liquid crystal display comprising the same. The blue phase liquid crystal composite material of the present disclosure is produced by the photo polymerization of the components comprising: a parent blue phase liquid crystal, a benzyne compound, a chiral compound, a photopolymerizable monomer, and a photoinitiator. The blue phase liquid crystal composite material of the present disclosure has the advantages of large Kerr constant, low (Continued)

36.9°C×200    44.9°C ×200 voltage, high contrast, rapid response to electric field, good stability, and the like.

8 Claims, 4 Drawing Sheets

(51) Int. Cl.
    *C09K 19/18*     (2006.01)
    *C09K 19/32*     (2006.01)
    *C09K 19/52*     (2006.01)
    *C09K 19/58*     (2006.01)
    *G02F 1/137*     (2006.01)
    *C09K 19/04*     (2006.01)
    *C09K 19/20*     (2006.01)

(52) U.S. Cl.
    CPC ............. *C09K 19/54* (2013.01); *C09K 19/542* (2013.01); *C09K 19/588* (2013.01); *G02F 1/137* (2013.01); *C09K 2019/0448* (2013.01); *C09K 2019/2078* (2013.01); *G02F 2001/13793* (2013.01)

(56) References Cited

FOREIGN PATENT DOCUMENTS

| | | |
|---|---|---|
| CN | 102517040 A | 6/2012 |
| CN | 102827615 A | 12/2012 |
| CN | 103289710 A | 9/2013 |
| CN | 102517035 B * | 5/2014 |
| JP | WO 2005080529 A1 * | 9/2005 ......... C09K 19/0275 |

OTHER PUBLICATIONS

English translation of Second Office Action issued by the Chinese Patent Office for Chinese Patent Application No. 201310214774.X, 4 pages.
The State Intellectual Property Office of the People's Republic of China ("SIPO") (Chinese language) second office action issued on Jan. 15, 2015 by SIPO in Chinese Patent Application 201310214774.X. Four (4) pages.
English Translation of the State Intellectual Property Office of the People's Republic of China ("SIPO") (Chinese language) second office action issued on Jan. 15, 2015 by SIPO in Chinese Patent Application 201310214774.X. Five (5) pages.
First Office Action issued by the Chinese Patent Office for Chinese Patent Application No. 201310214774.X dated Mar. 27, 2014, 6pgs.
English translation of First Office Action issued by the Chinese Patent Office for Chinese Patent Application No. 201310214774.X dated Mar. 27, 2014, 4pgs.
International Search Report for International Application No. PCT/CN2013/087264, 13pgs.
International Preliminary Report on Patentability issued Dec. 1, 2015; PCT/CN2013/087264.

\* cited by examiner 36.9°C×200    44.9°C ×200

BLUE PHASE LIQUID CRYSTAL COMPOSITE MATERIAL AND LIQUID CRYSTAL DISPLAY COMPRISING THE SAME

CROSS REFERENCE TO RELATED APPLICATIONS

This application is based on International Application No. PCT/CN2013/087264 filed on Nov. 15, 2013, which claims priority to Chinese National Application No. 201310214774.X filed on May 31, 2013. The entire contents of each and every foregoing application are incorporated herein by reference.

TECHNICAL FIELD

The present disclosure relates to blue phase liquid crystal composite materials and a liquid crystal display comprising the same.

BACKGROUND

Blue phase liquid crystal (Liquid crystalline Blue Phases, BPs) is a special phase which is macroscopically between an isotropic liquid crystal and a cholesteric phase liquid crystal, and commonly occurs in a highly chiral liquid crystal system. Microscopically, the blue phase is of lattice defect without birefringence phenomena, of which the lattice size is comparable to the order of magnitude of the wavelength of visible light (hundreds of nanometers). Blue phases can be divided into three subphases according to the crystal structure, which are designated as Blue phase I (BPI), Blue phase II (BPII), and Blue phase III (BPIII), with the corresponding lattice structures of body-centered cubic, simple cubic, and amorphous state.

The blue phase liquid crystals have an electric field response time in microseconds due to the occurrence of Kerr effect, as compared to electro-optical response of the conventional liquid crystals. Moreover, the blue phase liquid crystal display has a wide visual angle, requires no liquid crystal alignment layer, has a low drive voltage (only ⅓ of that of TFT liquid crystal display), and it is therefore considered as the most promising rapid electro-optical response liquid crystal display material of the next generation.

Because a nano-liquid crystal complex has a very small Kerr constant, the working voltage of the liquid crystal display based on Kerr effect is still too high (>50 Vrms, wherein rms indicates root mean square, and Vrms indicates effective value of alternate current voltage), and thus such liquid crystal display cannot be effectively applied to conventional non-crystal thin film transistor.

The Kerr constant K is positively proportional to the following equation:

$$\frac{\Delta n_{induced}}{\lambda E^2} \approx \Delta n \cdot \Delta \varepsilon \frac{\varepsilon_0 P^2}{k \lambda (2\pi)^2}$$

In the equation above, $\Delta n_{induced}$ indicates electric field-induced birefringence, $\lambda$ is the wavelength of the incident light, E is applied electric field, $\Delta n$ is the birefringence of the liquid crystal, $\Delta \varepsilon$ is the anisotropic dielectric constant, k is the elastic constant, P is the screw pitch of the liquid crystal, and $\pi$ is the circumference ratio.

As can be seen, increasing both birefringence and dielectric constant favors the increase of the K value. Therefore, it becomes a key to synthesize a liquid crystal material with a large dielectric constant and a large birefringence in order to increase the Kerr constant of blue phase liquid crystals. The present disclosure is directed to solving the problems of low Kerr constant of the blue phase liquid crystal composite materials produced using the methods known by persons skilled in the art and to providing a blue phase liquid crystal composite material with a large Kerr constant.

SUMMARY

The present disclosure provides a blue phase liquid crystal composite material, wherein the blue phase liquid crystal composite material is produced by the photo-polymerization of the components comprising: a parent blue phase liquid crystal, an alkynylbenzene compound, a chiral compound, a photo-polymerizable monomer, and a photoinitiator.

For example, the weight percentage of each of the components is:

parent blue phase liquid crystal: 55.0 wt %-84.9 wt %;
benzyne compound: 5.0 wt %-30.0 wt %;
chiral compound: 5.0 wt %-30.0 wt %;
photo-polymerizable monomer: 5.0 wt %-30.0 wt %; and
photoinitiator: 0.1 wt %-2.0 wt %.

The benzyne compound has the structure of formula below,

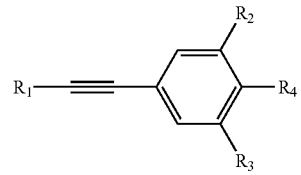

wherein $R_1$ is any one of alkylphenyl, alkoxyphenyl, alkylbiphenyl, alkoxybiphenyl, alkylphenylethynyl, alkoxyphenylethynyl, alkylnaphthyl, and alkoxynaphthyl; $R_2$ is hydrogen or fluoro; $R_3$ is hydrogen or fluoro; and $R_4$ is any one of cyano, thiocyano, trifluoromethyl, p-cyanophenyl, p-thiocyanophenyl, p-trifluoromethylphenyl.

$R_1$ has the structure of formula selected from the group consisting of:

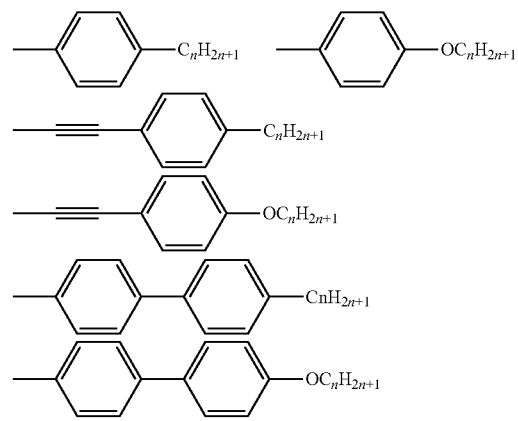

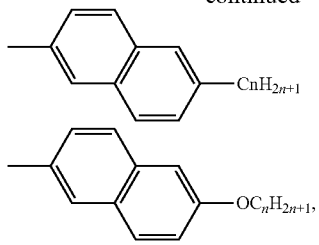

wherein n is an integer between 1-20.

$R_4$ has the structure of formula selected from the group consisting of:

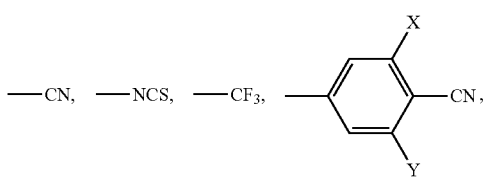

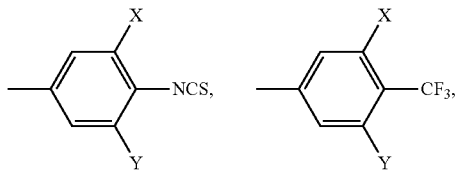

wherein X and Y are independently selected from a hydrogen atom or a fluorine atom.

For example, the chiral compound is an isosorbitol compound or a mannitol chiral compound.

The isosorbitol compound and the mannitol chiral compound have the structure of formula selected from the group consisting of:

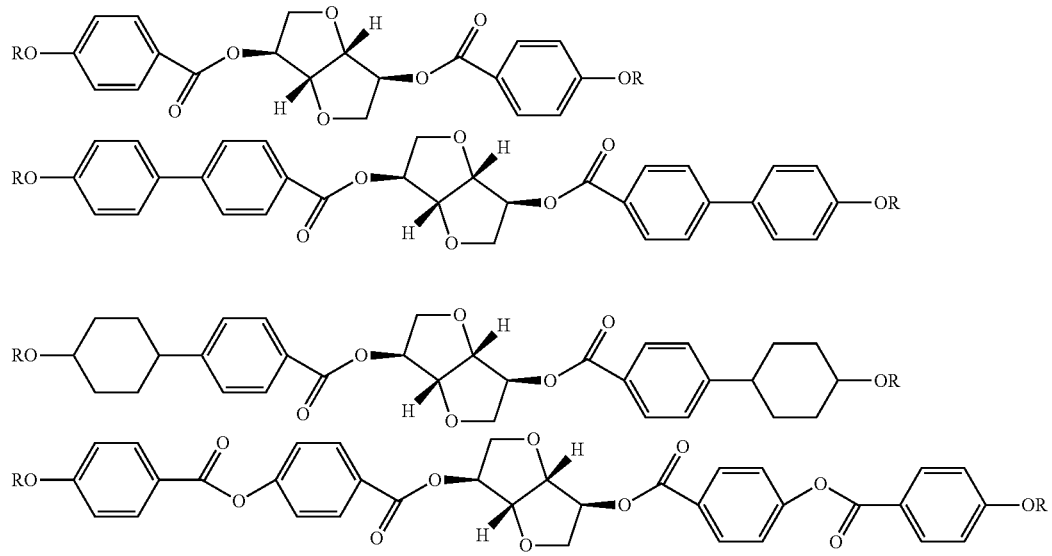

wherein R is alkyl having from 1 to 10 carbon atoms.

For example, the photo-polymerizable monomer can be one or more of 12HMA, TMPTMA, C6M, and C3M, wherein 12HMA, TMPTMA, C6M, and C3M have the structure of formula below:

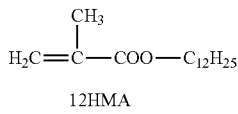

12HMA

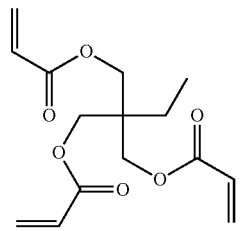

TMPTMA

-continued

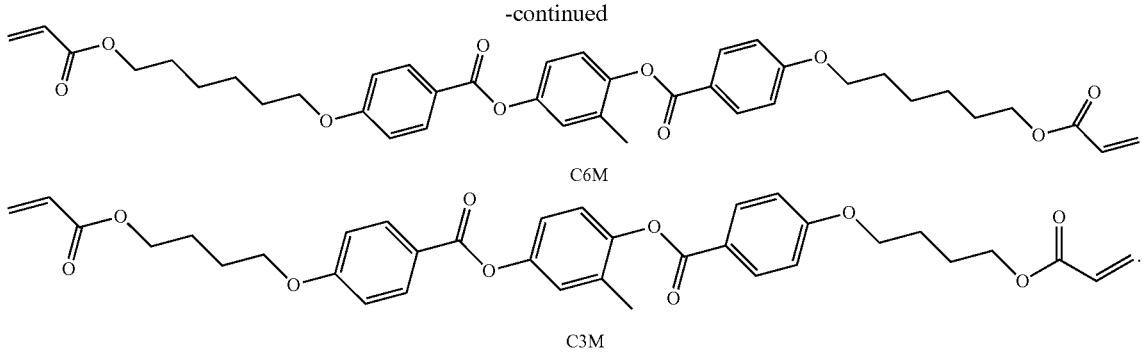

C6M

C3M

For example, the photoinitiator is an ultraviolet photoinitiator 2,2-dimethoxy-2-phenylacetophenone represented by the following structural formula:

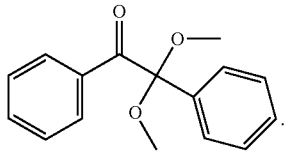 [SMILES: COC(OC)(C(=O)c1ccccc1)c1ccccc1]

A liquid crystal display is further provided, which comprises the blue phase liquid crystal composite material as described above.

DETAILED DESCRIPTION

Figure 1:
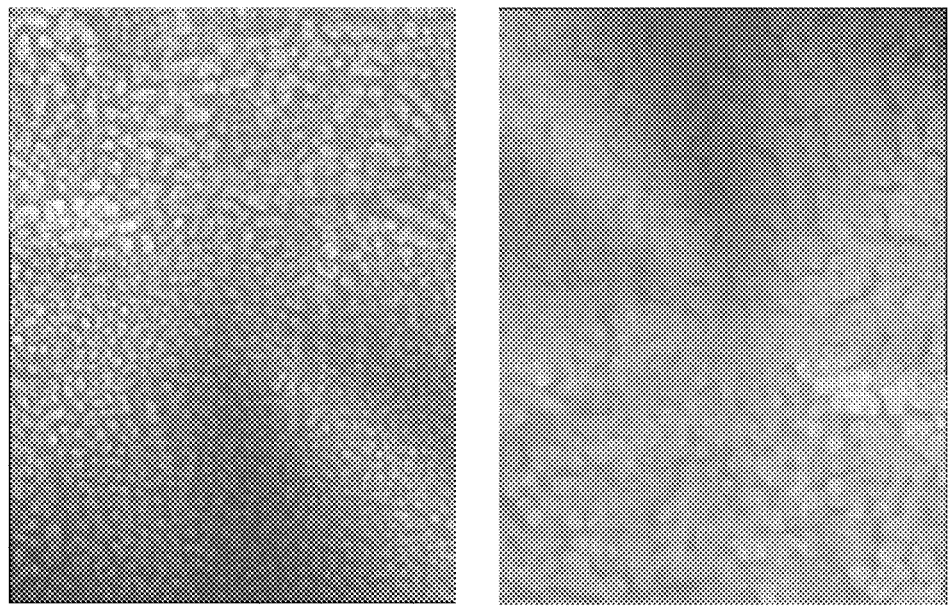
FIG. 1 illustrates the blue phase texture of the blue phase liquid crystal composite material of Example 1 of the invention at different temperature under polarized light.

In order that the skilled artisan can better understand the technical solutions of embodiments of the invention, the invention will be further described in detail in conjunction with figures and specific embodiments.

The present disclosure provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator.

Where, the weight percentage of each of the components is:

parent blue phase liquid crystal: 55.0 wt %-84.9 wt %;
benzyne compound: 5.0 wt %-30.0 wt %;
chiral compound: 5.0 wt %-30.0 wt %;
photo-polymerizable monomer: 5.0 wt %-30.0 wt %; and
photoinitiator: 0.1 wt %-2.0 wt %.

For example, the aforesaid components can be mixed thoroughly in a certain ratio and irradiated at a certain temperature (for example, at room temperature) with light at a wavelength corresponding to the photoinitiator for a period of time to initiate the polymerization of the photo-polymerizable monomer, to provide the blue phase liquid crystal composite material. A skilled artisan can readily determine the wavelength range and the irradiation duration in view of the photoinitiator used.

The drive voltage of a polymer dispersed blue phase liquid crystal is primarily dependent on the Kerr constant K of the material. The increase of K value favors the decrease of the drive voltage of a polymer dispersed blue phase liquid crystal, and the increase of the birefringence of the material favors the increase of K value.

By adding benzyne molecules, which have a large dielectric constant ($\Delta \epsilon$) and a large birefringence ($\Delta n$), to the parent blue phase liquid crystal, a blue phase liquid crystal composite material with a large Kerr constant and a low voltage can be obtained upon polymerization. The saturation voltage of a blue phase liquid crystal composite material can be as low as 34V, and the magnitude of the Kerr constant can be $10^{-10}$ mV$^2$, which is about 100 times larger than an ordinary blue phase liquid crystal. The blue phase liquid crystal composite material provided in the present disclosure, therefore, has the advantages of low voltage, high contrast, rapid response to electric field, good stability, and the like.

By applying the aforesaid blue phase liquid crystal composite material to a liquid crystal display, the present disclosure further provide a liquid crystal display with a low drive voltage and a rapid response to electric field, thereby solving the problem of the liquid crystal display prepared by the prior method which has a high drive voltage and a slow response to electric field. The liquid crystal display can be any product or component having a display function, such as a liquid crystal panel, a cell phone, a tablet, a television, a display, a laptop, a digital frame, a navigator, and the like.

The following examples are provided to illustrate the process for preparing the blue phase liquid crystal composite material. The examples are illustrative only and not intended to limit the scope of the invention.

Example 1

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator, wherein the benzyne compound has the structure of formula below,

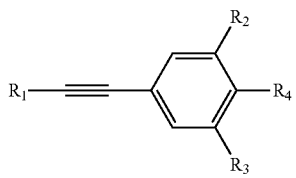

wherein $R_1$ has the structure of formula below,

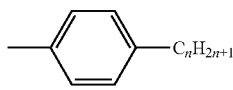

wherein n is 2; $R_2$ is hydrogen; $R_3$ is hydrogen; and $R_4$ is cyano.

The parent blue phase liquid crystal is SLC-X (available from Yongsheng Huatsing Liquid Crystal Co., Ltd, $\Delta n=0.253$, $\Delta\varepsilon=29.6$, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

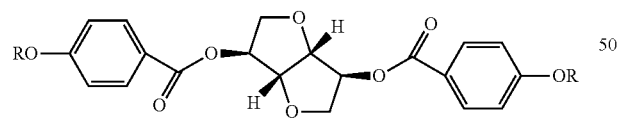

wherein R is methyl.

The photo-polymerizable monomer is 12HMA which has the structure of formula below:

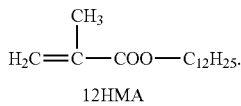

12HMA

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm$^2$ at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta\varepsilon$, and saturation voltage, and the results are shown in Table 1.

Example 2

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

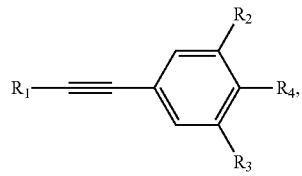

wherein $R_1$ has the structure of formula below:

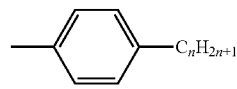

wherein n is 4; $R_2$ is fluoro; $R_3$ is hydrogen; $R_4$ is cyano.

The parent blue phase liquid crystal is SLC-X (available from Yongsheng Huatsing Liquid Crystal Co., Ltd, $\Delta n=0.253$, $\Delta\varepsilon=29.6$, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

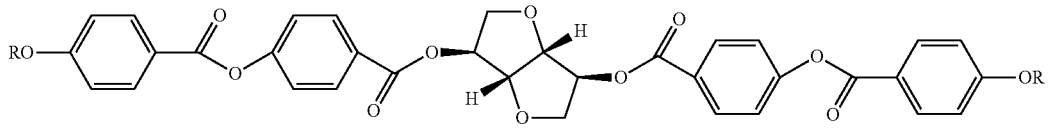

wherein R is propyl.

The photo-polymerizable monomer is C6M which has the structure of formula below:

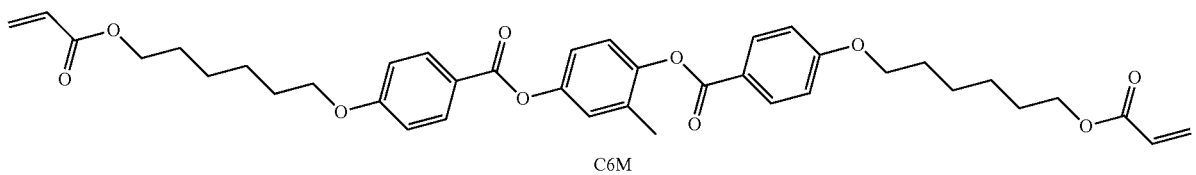

C6M

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Example 3

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

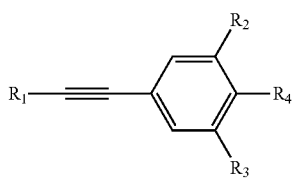

wherein R1 has the structure of formula below,

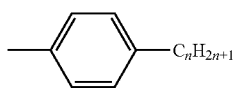

wherein n is 12; $R_2$ is fluoro; $R_3$ is fluoro; $R_4$ is cyano.

The parent blue phase liquid crystal is SLC-X (available from Yongsheng Huatsing Liquid Crystal Co., Ltd, $\Delta n$=0.253, $\Delta \in$=29.6, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

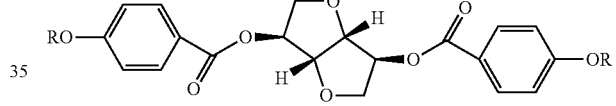

wherein R is n-decyl.

The photo-polymerizable monomer is 12HMA which has the structure of formula below:

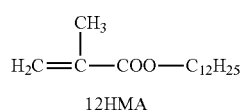

12HMA

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Example 4

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

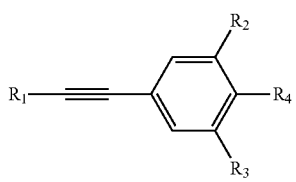

wherein $R_1$ has the structure of formula below,

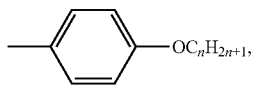

wherein n is 16; $R_2$ is fluoro; $R_3$ is fluoro; $R_4$ is thiocyano.

The parent blue phase liquid crystal is SLC-X (available from Yongsheng Huatsing Liquid Crystal Co., Ltd, $\Delta n=0.253$, $\Delta \in =29.6$, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

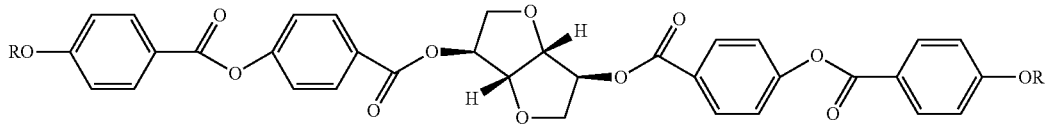

wherein R is n-hexyl.

The photo-polymerizable monomer is C6M which has the structure of formula below,

C6M

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Example 5

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

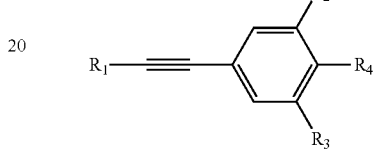

wherein $R_1$ has the structure of formula below,

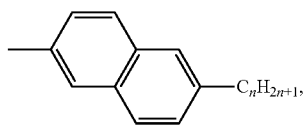

wherein n is 8; $R_2$ is hydrogen; $R_3$ is hydrogen; $R_4$ has the structure of formula below,

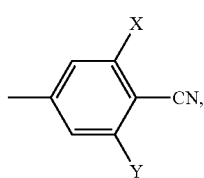

wherein X is a hydrogen atom, Y is a fluorine atom.

The parent blue phase liquid crystal is SLC-X (available from Yongsheng Huatsing Liquid Crystal Co., Ltd, Δn=0.253, Δ∈=29.6, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

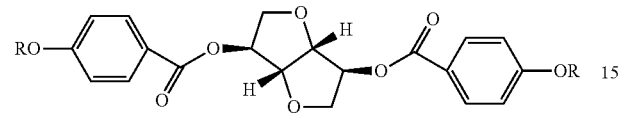

wherein R is n-decyl.

The photo-polymerizable monomer is 12HMA which has the structure of formula below,

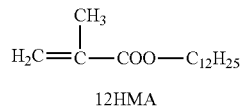

12HMA

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for Δn, Δ∈, and saturation voltage, and the results are shown in Table 1.

Example 6

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

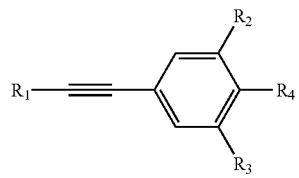

wherein $R_1$ has the structure of formula below,

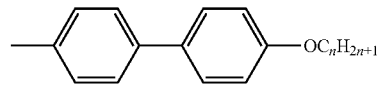

wherein n is 20; $R_2$ is fluoro; $R_3$ is fluoro; $R_4$ is trifluoromethyl.

The parent blue phase liquid crystal is SLC-X (available from Yongsheng Huatsing Liquid Crystal Co., Ltd, Δn=0.253, Δ∈=29.6, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

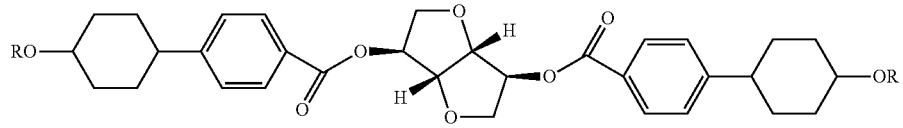

wherein R is n-heptyl.

The photo-polymerizable monomer is TMPTMA which has the structure of formula below,

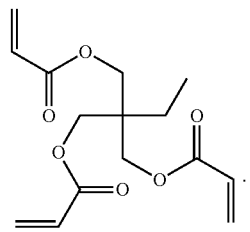 [SMILES: C=CC(=O)OCC(CC)(COC(=O)C=C)COC(=O)C=C]

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for Δn, Δ∈, and saturation voltage, and the results are shown in Table 1.

Example 7

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

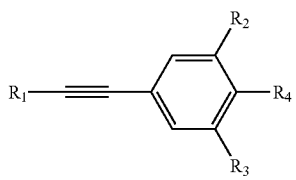

wherein $R_1$ has the structure of formula below,

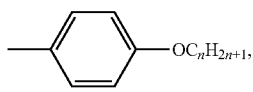

wherein n is 18; $R_2$ is hydrogen; $R_3$ is hydrogen; $R_4$ has the structure of formula below,

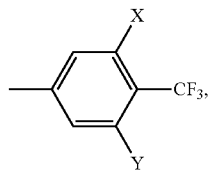

wherein X and Y are both a fluorine atom.

The parent blue phase liquid crystal is SLC-X (available from Yongsheng Huatsing Liquid Crystal Co., Ltd, $\Delta n=0.253$, $\Delta \epsilon=29.6$, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

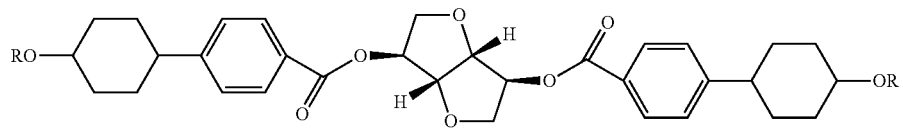

wherein R is n-nonyl.

The photo-polymerizable monomer is C3M which has the structure of formula below,

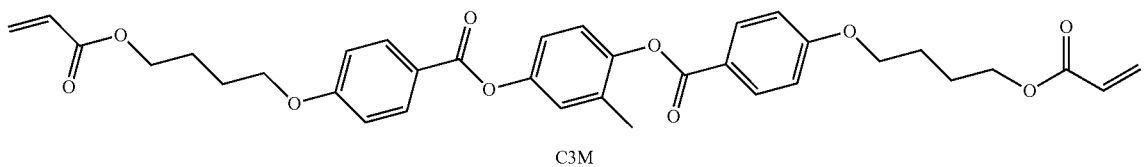 [SMILES: C=CC(=O)OCCCCOc1ccc(C(=O)Oc2ccc(OC(=O)c3ccc(OCCCCOC(=O)C=C)cc3)c(C)c2)cc1]

C3M

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Example 8

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

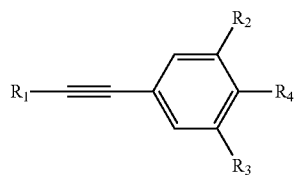

wherein $R_1$ has the structure of formula below,

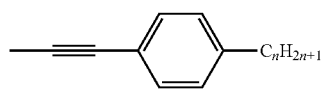

wherein n is 15; $R_2$ is fluoro; $R_3$ is fluoro;
$R_4$ has the structure of formula below,

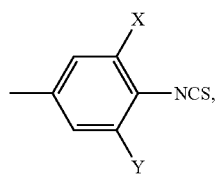

wherein X is a fluorine atom, Y is a hydrogen atom.

The parent blue phase liquid crystal is SLC-X (available from Yongsheng Huatsing Liquid Crystal Co., Ltd, $\Delta n=0.253$, $\Delta \in =29.6$, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

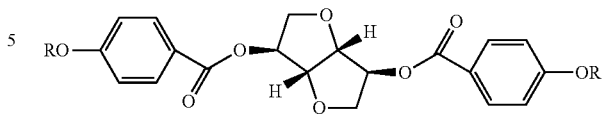

wherein R is propyl.

The photo-polymerizable monomer is TMPTMA which has the structure of formula below,

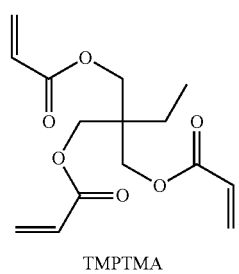

TMPTMA

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Example 9

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

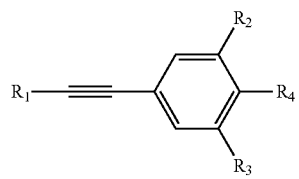

wherein $R_1$ has the structure of formula below,

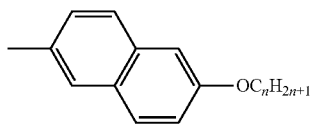

wherein n is 5; $R_2$ is fluoro; $R_3$ is fluoro; $R_4$ is thiocyano.

The parent blue phase liquid crystal is SLC-X (available from Yongsheng Huatsing Liquid Crystal Co., Ltd, $\Delta n=0.253$, $\Delta \in =29.6$, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

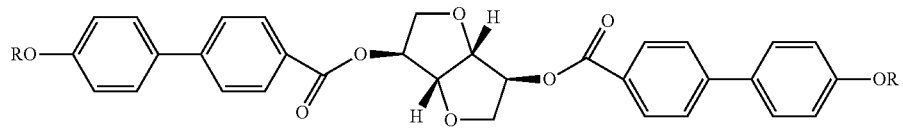

wherein R is n-butyl.

The photo-polymerizable monomer is C6M which has the structure of formula below,

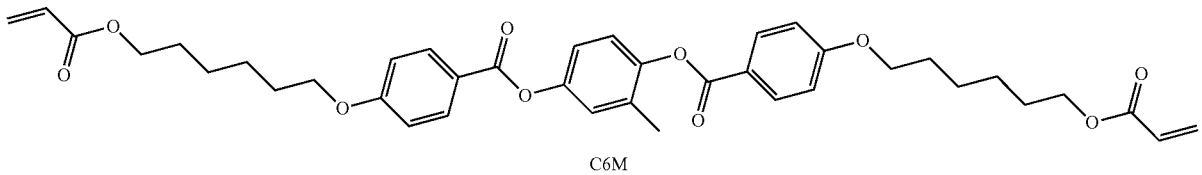 [SMILES: C=CC(=O)OCCCCCCOc1ccc(C(=O)Oc2ccc(OC(=O)c3ccc(OCCCCCCOC(=O)C=C)cc3)c(C)c2)cc1]

C6M

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Example 10

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

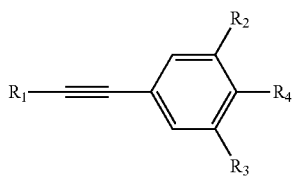

wherein $R_1$ has the structure of formula below,

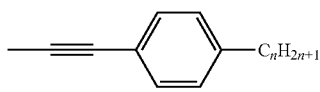

wherein n is 14; $R_2$ is hydrogen; $R_3$ is hydrogen; $R_4$ has the structure of formula below,

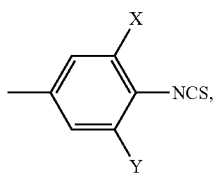

wherein X is a fluorine atom, Y is a hydrogen atom.

The parent blue phase liquid crystal is SLC-X (available from Yongsheng Huatsing Liquid Crystal Co., Ltd, Δn=0.253, Δ∈=29.6, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

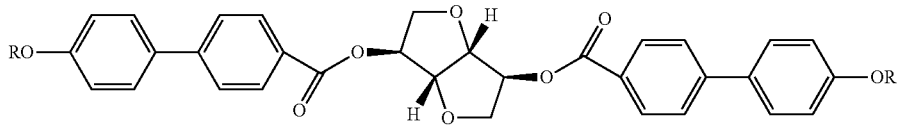

wherein R is ethyl.

The photo-polymerizable monomer is TMPTMA which has the structure of formula below,

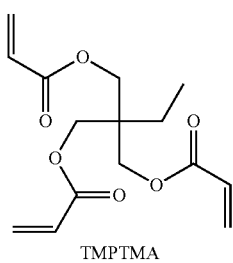

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm2 at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for Δn, Δ∈, and saturation voltage, and the results are shown in Table 1.

Example 11

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

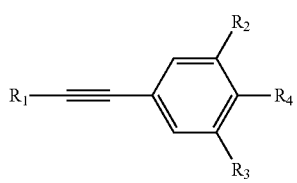

wherein $R_1$ has the structure of formula below,

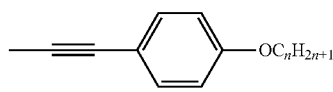

wherein n is 1; $R_2$ is fluoro; $R_3$ is fluoro; $R_4$ is fluoromethyl.

The parent blue phase liquid crystal is SLC-X (available from Yongsheng Huatsing Liquid Crystal Co., Ltd, Δn=0.253, Δ∈=29.6, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

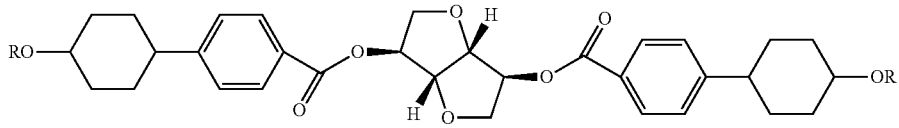

wherein R is methyl.

The photo-polymerizable monomer is C6M which has the structure of formula below,

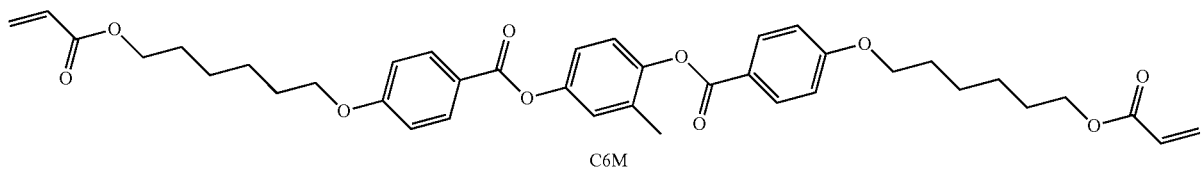 [SMILES: C=CC(=O)OCCCCCCOc1ccc(C(=O)Oc2ccc(OC(=O)c3ccc(OCCCCCCOC(=O)C=C)cc3)c(C)c2)cc1]

C6M

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm2 at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for Δn, Δ∈, and saturation voltage, and the results are shown in Table 1.

Example 12

The example provides a blue phase liquid crystal composite material, wherein the blue phase liquid crystal composite material is produced by the photo polymerization of the components comprising: a parent blue phase liquid crystal, a benzyne compound, a chiral compound, a photo-polymerizable monomer, and a photoinitiator;

wherein the benzyne compound has the structure of formula below,

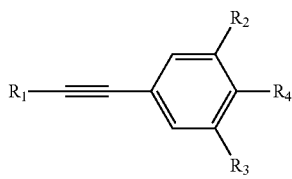

wherein $R_1$ has the structure of formula below,

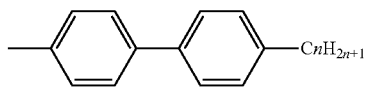

wherein n is 3; $R_2$ is hydrogen; $R_3$ is hydrogen;

$R_4$ has the structure of formula below,

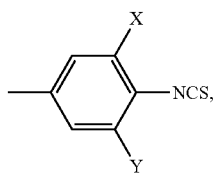

wherein X is a fluorine atom, Y is a hydrogen atom.

The parent blue phase liquid crystal is SLC-X (available from Yongsheng Huatsing Liquid Crystal Co., Ltd, Δn=0.253, Δ∈=29.6, 298K), which mainly comprises a biphenyl nitrile liquid crystal (biphenyl alkyl nitrile liquid crystal or biphenyl alkoxynitrile liquid crystal) and a fluorine containing small molecule liquid crystal. The parent blue phase liquid crystal has a viscosity less than 50 mPa, a melting point lower than −40° C., and a clearing point at 30-200° C.

The chiral compound has the structure of formula below:

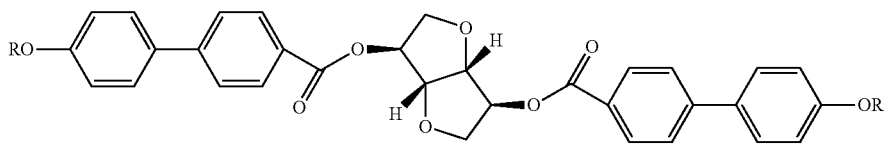

wherein R is methyl.

The photo-polymerizable monomer is TMPTMA which has the structure of formula below,

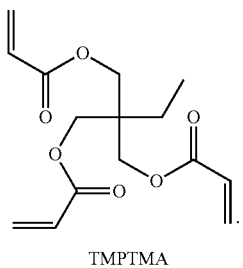

TMPTMA

The photoinitiator is 2,2-dimethoxy-2-phenylacetophenone (trade name 651, available from Adamas Reagent, Ltd.).

The weight percentages of the aforesaid components are shown in Table 1.

The aforesaid components are mixed according to the weight percentages as shown in Table 1, and then filled into a liquid crystal box. After irradiation with ultraviolet light at 10 mW/cm² at room temperature for 20 minutes, a blue phase liquid crystal composite material is formed. By observation with a polarizing microscope, the temperature range of this blue phase liquid crystal composite material can reach the room temperature after polymerization. The resulting blue phase liquid crystal composite material is tested for $\Delta n$, $\Delta \in$, and saturation voltage, and the results are shown in Table 1.

Comparative Example

The Comparative Example provides a blue phase liquid crystal composite material, wherein the blue phase liquid crystal composite material is produced by photo polymerization of the components which differ from those of Example 1 in that no benzyne compound is included, and the parent blue phase liquid crystal with the same weight percentage as the benzyne compound is included as the substituent. Other components and weight percentages thereof in the blue phase liquid crystal composite material are the same as those used in Example 1. The resulting blue phase liquid crystal composite material is tested for $\Delta n$, $\Delta \in$, and saturation voltage, and the results are shown in Table 1.

Testing Methods:

The method for evaluating the electro-optical performance of the blue phase liquid crystal composite material in the example is as follows:

The electro-optical hysteresis property of the blue phase liquid crystal composite material The electro-optical hysteresis property of the blue phase liquid crystal is usually defined as $\Delta V/V_{on}$, wherein $V_{on}$ is the voltage value corresponding to the maximal transmittance, and $\Delta V$ is the voltage difference between the forward voltage and the reverse voltage where the transmittance is half of the maximal transmittance. The smaller the $\Delta V/V_{on}$, the smaller the electro-optical hysteresis, and vice versa.

2. Calculation of Kerr Constant K of the Blue Phase Liquid Crystal Composite Material Calculation of Kerr constant K: based on the formula (1) for Kerr effect, within a certain range of field strength, $\Delta n_{induced}/\lambda$ is positively proportional to the square of electric field strength E. Kerr constant K will be the slope of the plot made from $\Delta n_{induced}/\lambda$ and E.

$$\Delta n_{induced} = \lambda K E^2 \quad (1)$$

TABLE 1

The raw components for the blue phase liquid crystal composite material and amounts thereof, and testing results for the performance of the composite material

| | Raw components for the blue phase liquid crystal composite material | | | | | | | |
|---|---|---|---|---|---|---|---|---|
| Ex. No. | benzyne compound (wt %) | parent blue phase liquid crystal (wt %) | chiral compound (wt %) | Type and wt % of photo-polymerizable monomer | photoinitiator (wt %) | Performance tests | | |
| | | | | | | $\Delta n$ | $\Delta \epsilon$ | Vsat |
| Comparative Example | — | 69.8 | 25 | C3M, 5 | 0.2 | 0.232 | 25.3 | 70 |
| 1 | 5 | 64.8 | 25 | C3M, 5 | 0.2 | 0.243 | 28.5 | 39 |
| 2 | 5 | 55 | 9.9 | TMPTMA, 30 | 0.1 | 0.252 | 30.2 | 36 |
| 3 | 15 | 69.5 | 5 | C6M, 10 | 0.5 | 0.255 | 33.2 | 34 |
| 4 | 8.2 | 81 | 5 | C3M, 5 | 0.8 | 0.242 | 28.7 | 36 |

TABLE 1-continued

The raw components for the blue phase liquid crystal composite material and amounts thereof, and testing results for the performance of the composite material

| | Raw components for the blue phase liquid crystal composite material | | | | | | | |
|---|---|---|---|---|---|---|---|---|
| Ex. No. | benzyne compound (wt %) | parent blue phase liquid crystal (wt %) | chiral compound (wt %) | Type and wt % of photo-polymerizable monomer | photoinitiator (wt %) | Performance tests | | |
| | | | | | | $\Delta n$ | $\Delta \epsilon$ | Vsat |
| 5 | 8.8 | 55 | 30 | 12HMA, 5 | 1.2 | 0.249 | 30.0 | 43 |
| 6 | 5 | 84.9 | 5 | C6M, 5 | 0.1 | 0.253 | 33.4 | 38 |
| 7 | 18 | 58.2 | 9 | 12HMA, 13 | 1.8 | 0.241 | 27.5 | 41 |
| 8 | 30 | 55 | 8 | TMPTMA, 5 | 2 | 0.244 | 30.2 | 37 |
| 9 | 23 | 58.6 | 13 | C6M, 5 | 0.4 | 0.251 | 32.2 | 39 |
| 10 | 16.7 | 56 | 5 | TMPTMA, 21 | 1.3 | 0.240 | 28.7 | 35 |
| 11 | 7 | 60.9 | 25 | C3M, 7 | 0.1 | 0.246 | 30.0 | 39 |
| 12 | 11 | 67 | 10 | 12HMA, 11.1 | 0.9 | 0.250 | 32.5 | 42 |

The blue phase texture of the blue phase liquid crystal composite material in Example 1 at different temperature under polarized light is shown in FIG. 1.

Figure 2:
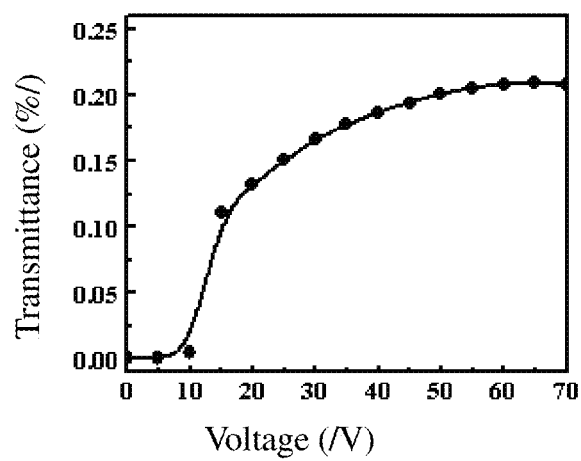
FIG. 2 illustrates plot of voltage vs. transmittance of the blue phase liquid crystal composite material of the Comparative Example of the invention.
Figure 3:
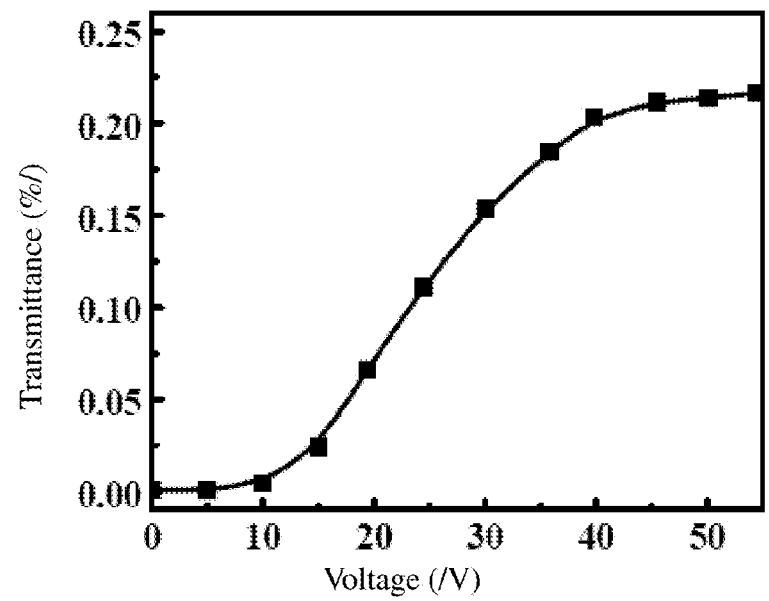
FIG. 3 illustrates plot of voltage vs. transmittance of the blue phase liquid crystal composite material of the Example 1 of the invention.
Figure 4:
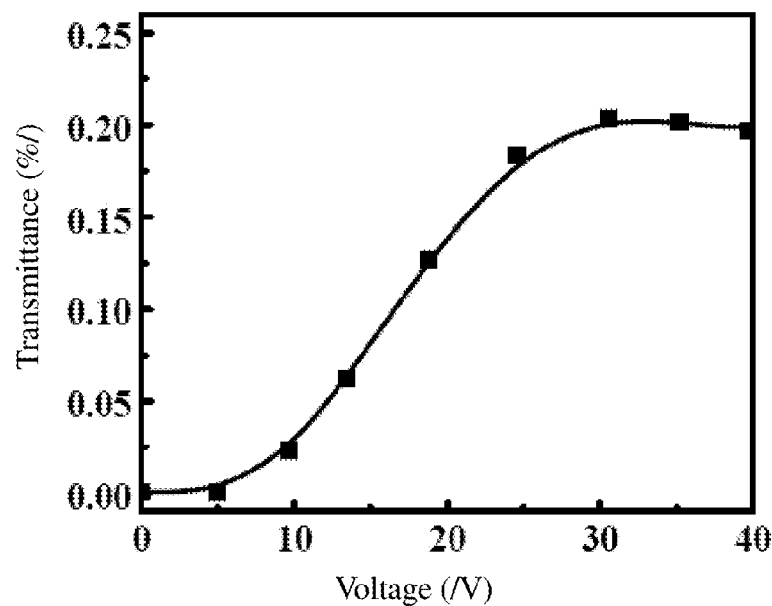
FIG. 4 illustrates plot of voltage vs. transmittance of the blue phase liquid crystal composite material of the Example 2 of the invention.
Figure 5:
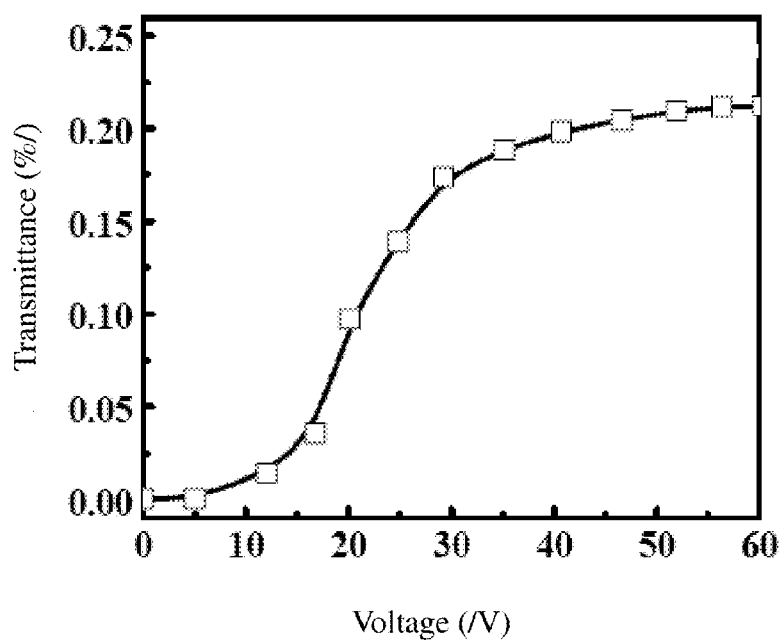
FIG. 5 illustrates plot of voltage vs. transmittance of the blue phase liquid crystal composite material of the Example 3 of the invention.

From Table 1 and FIG. 2, it can be seen that for Comparative Example 1, $\Delta n$ and $\Delta \epsilon$ are the smallest, and Vsat is the largest. After the addition of a benzyne compound, the $\Delta n$ and $\Delta \epsilon$ in all Examples have been increased to a certain extent, and the corresponding saturation voltages (Vsat) have been significantly reduced. Moreover, according to FIGS. 3-5, for the analogical compounds (Examples 1-3), the more the fluoro is on the side chain, the higher the increase of its dielectric constant is, and the smaller the saturation voltage is. This is because the fluoro in the side chain can significantly increase the dielectric constant of the compound. Therefore, after the addition in Examples 1-3, the dielectric constant of the blue phase liquid crystal composite materials gradually increases.

FIGS. 2-5 show the electro-optical performance tests of the blue phase liquid crystal composite materials, from which it can be seen that the saturation voltages (i.e., the voltages where the transmittance is the largest one) are 70V, 39V, 36V, and 34V, respectively. As can be seen, the saturation voltage has been effectively reduced.

Figure 6:
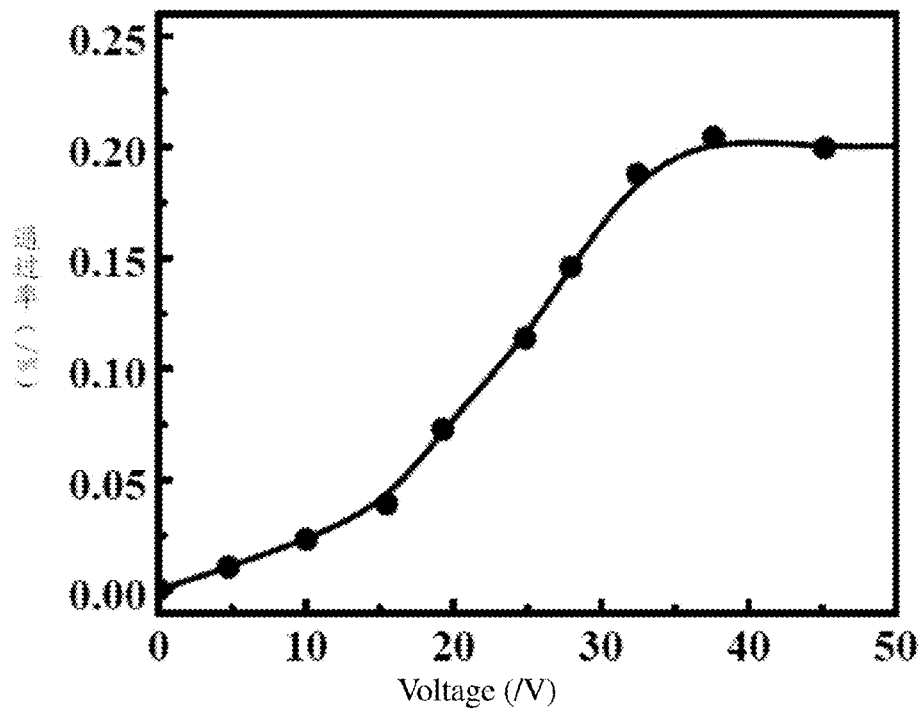
FIG. 6 illustrates plot of voltage vs. transmittance of the blue phase liquid crystal composite material of the Example 9 of the invention.

By way of example, the invention merely provides the electro-optical performance test chart plot for the blue phase liquid crystal composite material of Example 9 (see FIG. 6). As can be seen, the saturation voltage (the voltages where the transmittance is the largest one) is 39V.

Figure 7:
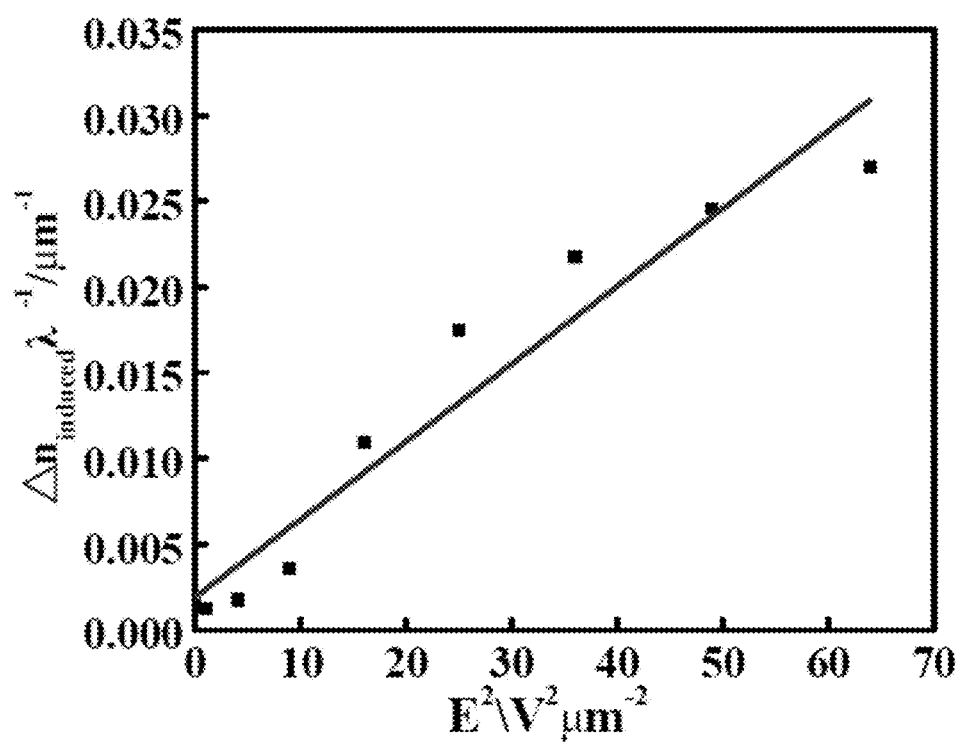
FIG. 7 illustrates plot of induced birefringence vs. squared voltage of the blue phase liquid crystal composite material of the Example 9 of the invention.

From the electro-optical curve measured for the blue phase liquid crystal composite material of each example, it can be derived that the order of magnitude of Kerr constant is $10^{-10}$ mV$^2$, which is about 100 times larger than Kerr constant of a coventinal blue phase liquid crystal. For example, FIG. 7 shows plot of induced birefringence vs. squared voltage of the blue phase liquid crystal composite material of the Example 9, in which the slope is Kerr constant of $4.5 \times 10^{-10}$ mV$^2$.

From the aforesaid testing results, it can be seen that by adding a benzyne compound with a large birefringence and high dielectric constant, the $\Delta n$ and $\Delta \epsilon$ of the blue phase liquid crystal composite material thus obtained are greatly increased, and the saturation voltages are greatly improved, as compared to no addition of the benzyne compound. The minimal saturation voltage has been decreased to 34V, and the effect is very significant.

Example 13

The example provides a liquid crystal display, which comprises the aforesaid blue phase liquid crystal composite material. The liquid crystal display can be any product or component having a display function, such as a liquid crystal panel, a cell phone, a tablet, a television, a display, a laptop, a digital frame, a navigator, and the like.

It should be understood that the aforesaid embodiments are merely for illustrating the principle of the invention, but the invention is not limited thereto. To a person of ordinary skill in the art, various variations and modifications can be made without departing from the spirits and fundamentals of the invention, and such variations and modifications will be contemplated within the scope of the invention.

This application claims the priority of Chinese application No. 201310214774.X filed on May 31, 2013, which is incorporated herein by reference in its entirety as part of the present application.

The invention claimed is:

1. A blue phase liquid crystal composite material, comprising 55.0 wt %-84.9 wt % of a parent blue phase liquid crystal, 5.0 wt %-30.0 wt % of a benzyne compound, 5.0 wt %-30.0 wt % of a chiral compound, 5.0 wt %-30.0 wt % of a photo-polymerizable monomer, and 0.1 wt %-2.0 wt % of a photoinitiator,
wherein the benzyne compound has the structural of formula below:

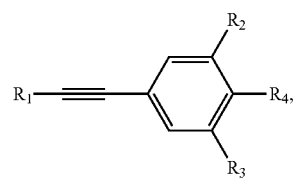

wherein $R_1$ is any one of alkylphenyl, alkoxyphenyl, alkylbiphenyl, alkoxybiphenyl, alkylphenylethynyl, alkoxyphenylethynyl, alkylnaphthyl, or alkoxynaphthyl;
$R_2$ is hydrogen or fluoro;
$R_3$ is hydrogen or fluoro; and $R_4$ is any one of cyano, thiocyano, trifluoromethyl, p-cyanophenyl, p-thiocyanophenyl, or p-trifluoromethylphenyl, wherein the blue phase liquid crystal composite material having a Kerr constant up to an order of magnitude of $10^{-10}$ mV$^2$ and a voltage as low as 34V.

2. The blue phase liquid crystal composite material according to claim 1, wherein $R_1$ has the structure of formula selected from the group consisting of:

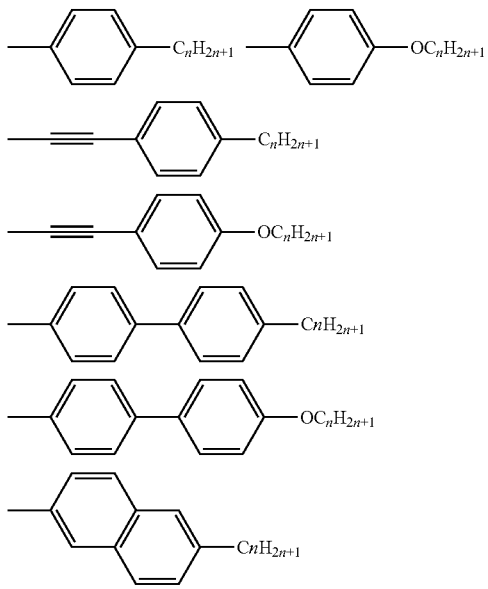

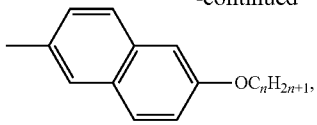

wherein n is an integer between 1-20.

3. The blue phase liquid crystal composite material according to claim 1, wherein $R_4$ has the structure of formula selected from the group consisting of:

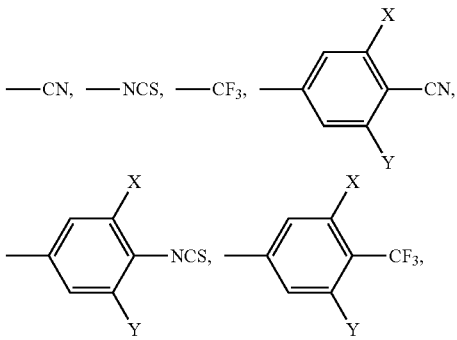

wherein X and Y are independently selected from a hydrogen atom or a fluorine atom.

4. The blue phase liquid crystal composite material according to claim 1, wherein the chiral compound is an isosorbitol compound or a mannitol chiral compound.

5. The blue phase liquid crystal composite material according to claim 4, wherein the isosorbitol compound or the mannitol chiral compound has the structure of formula selected from the group consisting of:

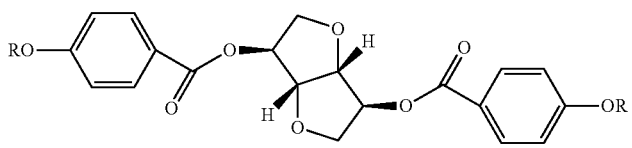

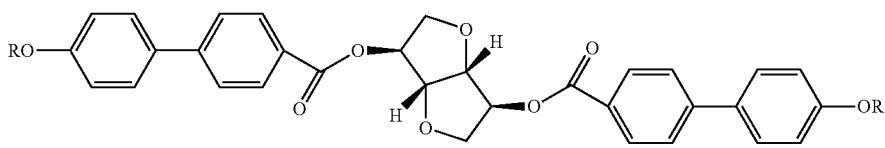

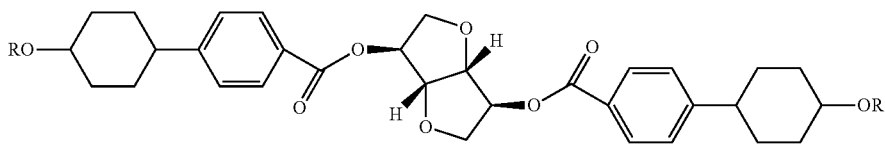

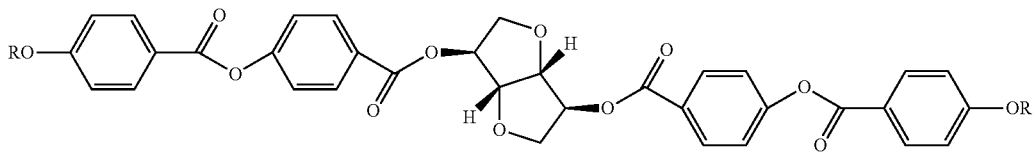

wherein R is alkyl having from 1 to 10 carbon atoms.

6. The blue phase liquid crystal composite material according to claim 1, wherein the photo-polymerizable monomer is one or more of 12HMA, TMPTMA, C6M, and C3M, wherein 12HMA, TMPTMA, C6M, and C3M have the structure of formula below:

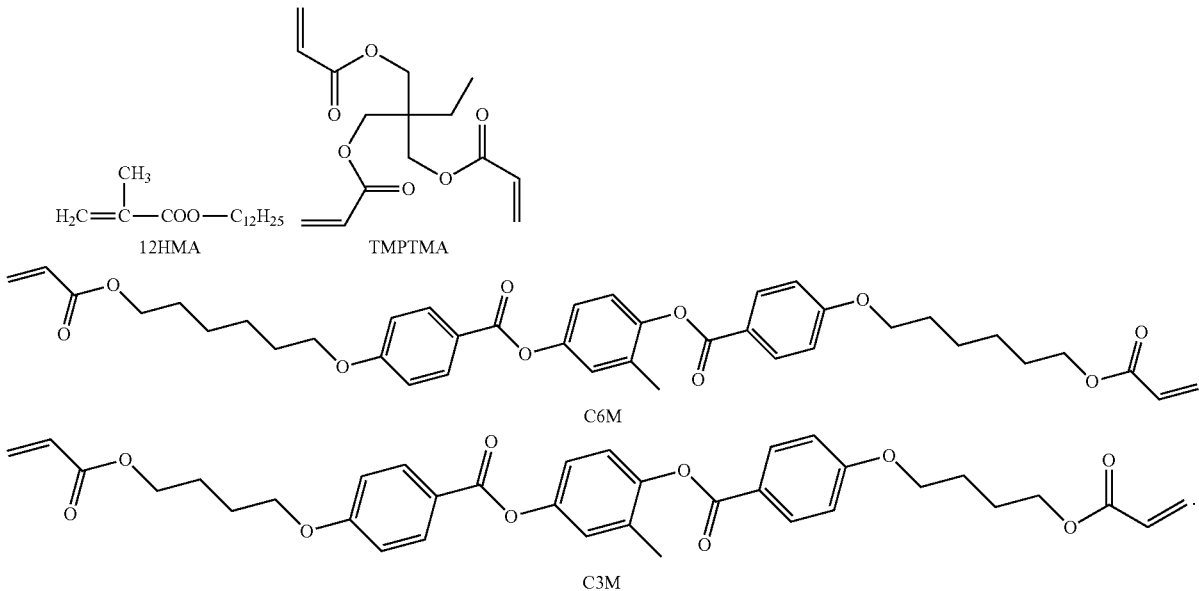

7. The blue phase liquid crystal composite material according to claim 1, wherein the photoinitiator is an ultraviolet photoinitiator 2,2-Dimethoxy-2-phenylacetophenone having the structural of formula below:

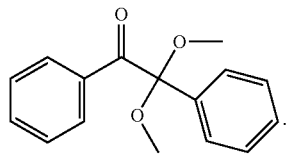 [SMILES: COC(OC)(C(=O)c1ccccc1)c1ccccc1]

8. A liquid crystal display comprising the blue phase liquid crystal composite material according to claim 1.

* * * * *